(12) United States Patent
Spijkerboer et al.

(10) Patent No.: US 12,145,785 B2
(45) Date of Patent: Nov. 19, 2024

(54) SHEET FOR USE IN PILL PACKAGES, AND POUCH FORMED FROM A SHEET

(71) Applicant: VMI Holland B.V., Epe (NL)

(72) Inventors: Henk Jan Spijkerboer, Epe (NL); Hermanus Johannes Albertus Wiskamp, Epe (NL)

(73) Assignee: VMI Holland B.V., Epe (NL)

( * ) Notice: Subject to any disclaimer, the term of this patent is extended or adjusted under 35 U.S.C. 154(b) by 0 days.

(21) Appl. No.: 18/518,652

(22) Filed: Nov. 24, 2023

(65) Prior Publication Data

US 2024/0083651 A1    Mar. 14, 2024

Related U.S. Application Data

(63) Continuation of application No. PCT/EP2022/073120, filed on Aug. 18, 2022.

(51) Int. Cl.
| | |
|---|---|
| *B65D 75/30* | (2006.01) |
| *B32B 27/08* | (2006.01) |
| *B32B 27/32* | (2006.01) |
| *B32B 27/36* | (2006.01) |
| *B65B 5/10* | (2006.01) |
| *B65B 9/06* | (2012.01) |
| *B65B 51/10* | (2006.01) |
| *B65B 61/02* | (2006.01) |

(Continued)

(52) U.S. Cl.
CPC .............. *B65D 75/30* (2013.01); *B32B 27/08* (2013.01); *B32B 27/32* (2013.01); *B32B 27/36* (2013.01); *B65B 5/103* (2013.01); *B65B 9/06* (2013.01); *B65B 51/10* (2013.01); *B65B 61/025* (2013.01); *B65B 61/06* (2013.01); *B65D 65/42* (2013.01); *B65D 75/26* (2013.01); *B65D 75/42* (2013.01); *B65D 75/527* (2013.01); *B65D 75/5805* (2013.01); *B32B 2250/02* (2013.01); *B32B 2250/24* (2013.01); *B32B 2255/10* (2013.01); *B32B 2307/4023* (2013.01); *B32B 2307/412* (2013.01); *B32B 2307/414* (2013.01); *B32B 2439/80* (2013.01); *B65D 2203/00* (2013.01)

(58) Field of Classification Search
CPC ........ B65D 75/30; B65D 65/42; B65D 75/26; B65D 75/42; B65D 75/527; B65D 75/5805; B65D 2203/00; B32B 27/08; B32B 27/32; B32B 27/36
USPC ................. 206/528, 538, 540; 383/123, 106
See application file for complete search history.

(56) References Cited

U.S. PATENT DOCUMENTS

| | | | |
|---|---|---|---|
| 7,014,363 B2 * | 3/2006 | Hanson | B65D 31/10 383/106 |
| 7,493,744 B2 | 2/2009 | Nishimura et al. | |

(Continued)

FOREIGN PATENT DOCUMENTS

| | | |
|---|---|---|
| DE | 79 31 081 U1 | 4/1980 |
| DE | 10 2006 019663 A1 | 2/2007 |

(Continued)

*Primary Examiner* — Jacob K Ackun
(74) *Attorney, Agent, or Firm* — N.V. Nederlandsch Octrooibureau (57) ABSTRACT

The disclosure relates to a sheet, a pouch containing pills made of a sheet material and a web of multiple of said pouches. The disclosure also relates to a method for manufacturing said web which makes use of said sheet. The pouches allow for optimal visibility of information printed on the pouches as well as optimal visibility of the pills for inspection purposes.

18 Claims, 7 Drawing Sheets

(51) Int. Cl.
*B65B 61/06* (2006.01)
*B65D 65/42* (2006.01)
*B65D 75/26* (2006.01)
*B65D 75/42* (2006.01)
*B65D 75/52* (2006.01)
*B65D 75/58* (2006.01)

(56) References Cited

U.S. PATENT DOCUMENTS

| | | | |
|---|---|---|---|
| 9,033,578 B2* | 5/2015 | Ostroy | B31B 70/14 493/213 |
| 2006/0027478 A1* | 2/2006 | Kaufman | B65D 33/004 383/106 |
| 2008/0032191 A1 | 2/2008 | Kennedy et al. | |
| 2011/0142377 A1* | 6/2011 | Bradley | B32B 27/10 383/106 |
| 2012/0070106 A1* | 3/2012 | Camargo-Parodi | B65D 75/5805 383/106 |
| 2012/0124943 A1* | 5/2012 | Nakamura | B65B 55/18 53/425 |
| 2014/0161376 A1* | 6/2014 | Chau | B32B 27/08 264/173.17 |
| 2015/0117800 A1* | 4/2015 | Petersen | B65D 33/04 383/106 |
| 2017/0015478 A1 | 1/2017 | Sebald et al. | |

FOREIGN PATENT DOCUMENTS

| | | |
|---|---|---|
| EP | 2 338 806 A1 | 6/2011 |
| ES | 1274839 U | 7/2021 |
| JP | 2015-508043 A | 3/2015 |
| KR | 2012 0012169 A | 2/2012 |
| KR | 101125714 B1 | 3/2012 |
| KR | 20120047186 A | 5/2012 |
| KR | 102 080 491 B1 | 2/2020 |
| WO | 2013/119972 A1 | 8/2013 |

* cited by examiner

SHEET FOR USE IN PILL PACKAGES, AND POUCH FORMED FROM A SHEET

The present disclosure relates to a sheet, a pouch containing pills made of a sheet material and a web of multiples of said pouches. The disclosure also relates to a method for manufacturing said web which makes use of said sheet.

INTRODUCTION

Pouches filled with an medicament prescription to a patient, in particular a medicament or combination of medicaments for one administration, and comprising printed information regarding the administration of said medicament(s), such as information about the patient, the contained medicaments and/or the timing of administration, are conveniently used by patients or hospitals. Such pouches enable a patient to take the prescribed medicaments at the right time, at the right dose and in the right combination without much effort. On the other hand, because these pouches contain a prescribed dose of medicaments and relevant information such as about the respective medicaments and patient, the pouches enable medical practitioners to provide patients with the necessary medicaments in an efficient way and a low risk of error.

The pouches are in general manufactured in long webs of multiple interconnected pouches which can be separated from each other for use of a single pouch. These webs can be manufactured from sheets of suitable material which are folded to form a first side and a second side of the web. On the first side or second side information can be printed providing relevant information. A predetermined prescription of medicaments can be introduced at a predetermined position in the folded sheet. The first side and second side can be sealed to each other at predetermined positions to provide compartments filled with said prescriptions. Single pouches can be obtained by separating pouches from the web at the position of their connection.

SUMMARY

The inventors have found that there is room for improvement with respect to the abovementioned pouches, in particular with regard to the readability of the information contained on the pouches and visibility of the contents of the pouches for inspection purposes.

In order to achieve this a first aspect relates to a sheet, comprising transparent and non-transparent strips extending in a longitudinal direction of said sheet, and each having a width in transverse direction of the sheet, wherein said transparent and non-transparent strips alternate in transverse direction of the sheet; wherein each non-transparent strip has a width which is less than the width of each transparent strip. Such a width difference can be in the range of 0.1 mm-10 mm, depending on sheet and pouch requirements.

In a further aspect a pouch for containing pills is formed of a sheet material, the pouch comprising: a first side and a second side connected via a bottom seal, a top seal opposite the bottom seal, and first and second side seals extending from the bottom edge fold to the top seal to define a space for containing pills, wherein the first side of said pouch is transparent and wherein the second side of said pouch is nontransparent from a position beyond the bottom edge fold towards a top edge opposite the bottom edge with the transparent portion of the sheet forming the bottom edge fold. The sheet material is preferably formed of the sheet defined above.

In a still further aspect a web of multiple of the above pouches is formed, wherein pouches in the web are interconnected via their respective first and second side edges.

A still further aspect relates to a method for manufacturing abovementioned web of pouches, comprising: providing a sheet as defined above; folding said sheet along a longitudinal fold line positioned in the transparent portion; wherein the fold defines a bottom edge of said web connecting a transparent first side and a substantially nontransparent second side; providing at one or more predetermined positions information on said non transparent second side; introducing at predetermined positions along the folded sheet one or more pills between said first side and second side in accordance with the in-formation provided at the second side; sealing the first side to the second side at predetermined positions transverse to the fold and at a position opposite to the fold to provide respective first side, second side and top seals of compartments containing said one or more pills, wherein each sealed compartment constitutes a pouch.

By having one side of a pill pouch substantially nontransparent, for example, with the transparent portion extending at most 20% of the package side, for example at most 10%, while allowing only a small strip along the fold be transparent (e.g., 0.1-10 mm), any information printed on the nontransparent side is maximally visible and allows for inclusion of optimal amounts of information and/or larger font size of text, of which the latter is in particular advantageous for elderly patients. The non-transparent second side also provides a background for the pills contained therein, allowing good visibility of the pills through the transparent first side of the pouch. This can be especially useful for inspection purposes of the pouch, where the pouches which have already been loaded with pills and sealed, and then are inspected for accurate loading of specific pills and amounts of pills. The nontransparent background forming fully or nearly fully one side ensures that any human inspection and/or inspection devices (cameras, sensors, etc.) have a clear background for accurate pill detection and counting. By ensuring the non-transparent portion has a width equal to or within 10 mm of the transparent portion, the non-transparent portion will not cross the fold to cover part of the first side (thereby ensuring all pills are visible from the first transparent side and none are covered by a non-transparent portion crossing the fold). Further, any transparent portion on the second side will have a width of 10% the full width of the pouch or less, ensuring that the nontransparent portion covers substantially all of the second side, providing a good background for all pills to be viewed for inspection purposes (as inspection is more difficult with a transparent background).

Also, production wise, the present configuration of the sheet material constituting the pouches/webs of pouches herein the width of each non-transparent strip is smaller than the width of each transparent strip with a width difference of at most 10 mm has advantages. This is due to the fact that the sheet can be folded in two equal parts constituting the first side and second side of the pouches/webs of pouches wherein the non-transparent part is not part of the fold. Because the transparent strips are typically more flexible than non-transparent strips, as they are in general less thick, the transparent strip part of the sheet is easier to fold. In addition, for the same reason, the edge of the non-transparent strip along the fold may prevent unintended deviations in the fold during the folding process, so that the fold is well aligned with the edge of the non-transparent part, e.g., the coating edge if the non-transparent part contains a coating.

This avoids production flaws and ensures uniformity of pouches within the web of pouches manufactured with the sheet.

DETAILED DESCRIPTION

A sheet is provided that can be used to manufacture a web of pill filled pouches. The pouches of the web can be separated from the pouches to form individual pouches. In accordance the teachings regarding the characteristics of the sheet may also apply to the pouch/web of pouches and the method of manufacture thereof.

The sheet can be designed as a composite sheet containing at least one layer of transparent base material and at least a second layer of a non-transparent coating. The non-transparent coating can be applied as a strip of uniform width in a longitudinal direction of the sheet. The longitudinal direction of the sheet can in this respect be defined as the direction in which the pouches of the web of pouches to be manufactured are connected to each other.

The transparent parts and non-transparent parts alternate in the direction orthogonal to the longitudinal direction of the sheet, e.g. in the transverse direction of the sheet. This has the result that the sheet comprises transparent and non-transparent strips extending in a longitudinal direction of the sheet. The sheet may be present in this respect as a roll of base material or "mother roll" in large lengths of up to hundreds of meters, such as between 100 m and 1000 m, such as approximately 600 m. The transverse direction is in general much smaller, for instance between 10 and 100 cm, for instance +/−280 mm for a sheet containing two transparent and two non-transparent alternating strips. The sheet may be provided on a roll with the strips extending in a radial direction to allow storage of such large lengths of sheet material and to allow easy supply in the process of making strips of pouches.

It is preferred that the sheet comprises an equal number of transparent and non-transparent strips. Such a sheet can be easily divided by cutting the sheet in longitudinal direction to obtain smaller sheets that can be folded into a folded sheet with a transparent first side and a non-transparent second side without loss of sheet material. In principle the sheet may contain any even number of strips in transverse direction. Because a web of pouches requires only a single non-transparent strip and a single transparent strip, a sheet may also consist of a single transparent and single non-transparent strip. Such a sheet with a single transparent and single non-transparent strip may be directly used for manufacturing a web of pouches, while a sheet with multiple alternating transparent and non-transparent strips has to be cut in longitudinal direction to obtain a sheet with a single transparent and single nontransparent strip that can be folded, printed, filled and sealed to obtain a web of pouches. Nevertheless, it may be preferred for storage purposes to initially provide the sheet with multiple alternating transparent and nontransparent strips, preferably on a supply roll.

The width of each non-transparent strip is smaller than the width of each transparent strip, with a width difference of at most 10 mm, for example, at most 2-8 mm, in some embodiments even less than 2 mm. This way, when a sheet with a single transparent and single non-transparent strip is folded to obtain a first side and an second side with equal dimensions, the non-transparent material is not part of the fold or exactly at the intersection of the transparent and non-transparent strips. That means that in a pouch produced with the sheet the first side of said pouch is fully (or at least substantially) transparent and the second side is substantially non-transparent. This can be through covering with a non-transparent coating extending from a position at a distance from the fold defining said bottom edge up to the top edge, wherein said distance from the fold defining said bottom edge is at most 2-8 mm, preferably at most 1-4 mm, for example. 0.1-1 mm. The distance/width difference should be at most 10 mm in order to ensure optimal readability of the information printed on the pouches and optimal inspection conditions with regard to the contained pills. The distance/width difference may be smaller than 10 mm, and the coated/non-transparent part of the sheet is not part of the fold. Suitable distances/width differences in this respect may for instance range from 0.1 mm to 10 mm such as between 0.5 mm and 8 mm, such as 5 mm.

In general the pills may be medicaments, tablets, or related pill products such as vitamin pills. Other kinds of pills may be applicable in different contexts as well. The pills are preferably 'discrete' in the sense that they can be dispensed one-by-one, individually, separately or in dose units. In case of white or light coloured pills a relatively dark background for may be desirable for inspection purposes. The one or more pills in a pouch may be a predetermined prescription of pills. The term 'a predetermined prescription of pills' in this regard may relate to a doctor's prescription or an otherwise advised amount and combination of pills suitable for intake at a certain moment or occasion.

In order to provide optimal contrast in terms of inspection of the pills and visibility of the information printed on the non-transparent part, the non-transparent strips of the sheet, and likewise the non-transparent parts of the pouches, e.g. the second sides of the pouches, preferably have a haze as determined in accordance with ASTM D1003 between 73 and 77%.

Each non-transparent strip may be formed by a nontransparent coating over a transparent base sheet.

The non-transparent coating may in principle have any desired colour and design, and may be applied as an ink. The choice of colour and design may in this respect depend on the colour and/or type of the pills in the pouches. In particular in case of combinations of prescribed pills, pills may have different colours for distinct pills. In that case a white coating may be preferred. A white coating, such as a white ink, may also be preferred because it allows optimal readability of the text printed on it and optimal contrast for inspection of the pills from the transparent side. Furthermore, a white colour matches the labels that patients are used to on other medicament products such as medicament bottles. This brings about a reliable impression to the patient, which benefits patient compliance.

It is also possible to design the colour of the nontransparent side such that the colour or pattern of colours itself provides information, for instance a red colour may indicate that intake should take place in the morning, while a green colour indicates that intake should take place in the evening. Such colour coding can be used in support of the information printed on the non-transparent parts. Colour codes may for instance be preferred when the pouches are meant for vitamins.

In order to provide optimal contrast for inspection of the pills, the transparent strips of the sheet and likewise the transparent parts of the pouches, e.g. the front sides, should be sufficiently transparent. In this respect the transparent parts preferably have a haze as determined in accordance with ASTM D1003 between 10 and 12%.

Suitable pouches can be manufactured with various base materials that meet the requirements with respect to flexibility, transparency, processability, etc. In this respect, it is preferred that a transparent plastic sheet is used as a transparent base sheet. Likewise the base material of the pouches can be a transparent plastic material. Suitable plastics may include without limitation polyethylene (PE), polypropylene (PP), such as biaxially oriented PP, polyethylene terephthalate (PET). Cellulose may also be suitable as a plastic material.

In an embodiment the transparent plastic sheet is a composite plastic sheet with multiple layers of plastic. In such a composite sheet a layer intended to be in contact with the pills (inner layer) may have other characteristics than a layer that is intended on the outside of a pouch (outer layer). For instance, the inner layer may be designed such that it allows heat sealing, while the outer layer provides an overall quality look and feel.

In an embodiment the transparent plastic sheet comprises a first layer of polyethylene (PE) and second layer of polyethylene terephthalate (PET). In this composite sheet a coating of non-transparent material is preferably applied on said second layer, the PET layer. Accordingly, in the pouch the sheet constituting the pouch comprises an inner layer of polyethylene (PE) and outer layer of polyethylene terephthalate (PET). The PE and PET layers are preferably adhered to each other with a suitable glue. Herein, said non-transparent coating can be formed on said outer layer, in particular on the second side of the pouch. In this regard the non-transparent coating can be provided on outer surface of the sheet or it can be provided between the PET and PE sheet.

More generally, a non-transparent coating in a pouch may thus be provided on the outer surface of a pouch or within the sheet material of the pouch between layers of a composite pouch.

Such PET/PE composite laminate sheets are very suitable in terms of production of webs of pouches. These materials also provide excellent moisture and oxygen protection leading to a longer shelf life of the contained pills. Overall, such a sheet material provides sufficient strength and protection to the contents of the pouches, but also allows easy tearing of the pouches to gain access to the contents. Pouches made of this sheet material further have a good quality feel and impression in particular because of the PET outer layer.

As mentioned above, the non-transparent side typically serves as the base for providing information onto the pouch, though in some embodiments information could be printed or otherwise added to the transparent side. The information can be provided by any suitable means, such as stamping or printing. In this respect the pouch typically suitably contains information printed onto said non-transparent coating. The printed information may concern information regarding the administration of said medicament(s), such as information about the patient, the contained medicaments and/or the timing of administration. The information may contain text, pictures, QR codes, and the like, or a combination thereof.

The terms "bottom", "top", "first" and "second side" in respect of the pouches are meant to define the relative arrangement of the pouch. For instance, these terms are not meant to indicate a particular orientation of the information or any absolute orientation with regard to a user.

In that respect a top as used herein may also be considered as bottom of the pouch and vice versa is held upside down. The same counts for the sides, which could be seen as top and bottom in various embodiments.

Information may have any orientation in this respect. For instance text may be in a reading orientation from top to bottom or vice versa, from a first side to a second side or vice versa or any other orientation.

In the process of manufacturing the web of pouches providing said information at predetermined positions on said non-transparent second side may take place before or after folding the sheet and/or forming of pouches. Typically the provision of the information, e.g. by printing, takes place after folding, just before introducing the pills between the first and second side of the folded sheet.

To ensure proper printing, the printing anvil can be sized or positioned such that the fold falls just outside the anvil, and is therefore not supported by the anvil. At the fold, the thickness of the pouches tends to be a bit more than twice the thickness of the single sheet, and thus if the fold would be between the anvil and printer head, it could cause the printer head to slightly tilt and therefore apply the print with less pressure near the fold. This is avoided by ensuring the fold is outside the anvil. This can also help to ensure that no printed material crosses the fold line (whether printed before or after folding), which could negatively influence the smooth folding and forming of the pouches and/or reduce the readability of the printed material.

Alternatively, the sheet from which the web of pouches is manufactured may be provided in such a design that the information does not have to be provided onto the non-transparent part during the process of manufacturing the web. In this case the sheet from which the web is manufactured may already be provided with information such as pictures, text or company logos prior to the step of folding, or the pouches may be a type where no additional information is provided or printed.

Pouches are typically manufactured as webs of pouches which are interconnected via their respective first and second side edges. The term "web" in the context of the present invention is to be understood as a system of interconnected elements, e.g. a string of interconnected pouches.

The first and second side edges may be separated with a perforated tear line, which allows separation of discrete pouches from the web of pouches.

The seals between consecutive pouches in a web may be realized by heat sealing. In this respect the sealing connections can be heat seals.

The connection between consecutive pouches may be formed by a single seal, e.g. a heat seal, with an optional tear line extending in said seal. In this case the side seals of a single pouch extend up to and including its first and second side edges.

The connection between consecutive pouches may comprise a second seal of a first pouch and a first side seal of a second, adjacent pouch, separated from each other by an unsealed area between adjacent pouches. In this case the side seals of a single pouch are at a short distance from its first and second side edges. The presence of an unsealed area between unsealed pouches makes it easier to separate discrete pouches from the web of pouches if a perforated tear line is positioned in the unsealed area.

In this respect the first side and a second side of a single pouch can also be sealingly interconnected at the top seal by means of a heat seal, which is provided in a step of sealing during the manufacturing process. The top seal may overlap with the top edge of the pouch, or the top seal can be at a short distance from the top edge. The latter can make it easier to open a single pouch from the top side to gain access to the contents of the pouch.

In this respect the first side and a second side of a single pouch can also be sealingly connected at the bottom seal by means of a heat seal. Also here the bottom seal may overlap with the bottom edge of the pouch, or the bottom seal can be at a short distance from the bottom edge. With respect to the bottom seal it is however typical that it is defined by a fold in the above described sheet material. This way the pouch can be made out of one sheet and a sealing connection between the first side and second side is provided without requirement for further sealing techniques.

Sealing the sides of pouches can be done in any order. Sealing the first side to the second side at predetermined positions transverse to the fold to provide compartments containing said predetermined prescription of medicaments may take place before or after introducing pills between the first side and second side of the folded sheet. On the other hand sealing the first side to the second side at or close to the top edge of each compartment typically takes place as a final sealing step after introducing the pills.

Both the transversal seals (side seals) and top seal of a pouch can be applied simultaneously, because this allows use of a single heat sealing device and ensures uniform dimensions of the pouches within a web of pouches. Accordingly, pills may also be introduced at predetermined positions along the folded sheet between said first side and second side in accordance with the information provided at the second side, before or after realizing a pouch compartment by means of transversal seals or after realizing one transversal seal of an intended pouch compartment.

In order to allow easy access to the contents of the pouches, the pouches may comprise a tear notch in the top of one or both of the side edges, which can be either a straight slit, a triangular notch or another configuration. The triangular notch can help to increase visibility, particularly when in a non-transparent section. In the case of a tear notch in the form of a straight slit, a printed marking can be added to increase visibility to the user. This tear notch allows for the use of smooth edges, which can make the pouches harder to open for children (more "child-safe"). There can also be a tear line along a sealing connection, for instance, by providing a tear notch at this position. This allows access to the contents of the pouch along the seal without damaging the information on the pouch. This way the information on the pouch remains visible, even after opening the pouch.

Alternatively or in addition, the pouches may have one or more serrated edges, for example, on the top edge. One or more serrated edges allow tearing open of pouches at any position, which makes it easy to open a pouch for anyone.

The non-transparent part of the second side of a pouch extends from a position at or within 10 mm from the bottom edge, for example, 2-8 mm towards a top edge opposite the bottom edge. Preferably, the non-transparent part may extend to at least the top seal, and may also extend beyond the top seal. For instance, the non-transparent part may extend up to the serrated edges if these are provided in the pouch or web of pouches. Such a configuration has the advantage that the visibility of the serrated edges is improved, and it will be easier for the user to tear the pouch open.

The various aspects and features described and shown in the specification can be applied, individually, wherever possible. These individual aspects, in particular the aspects and features described in the attached dependent claims, can be made subject of divisional patent applications.

DETAILED DESCRIPTION OF THE DRAWINGS

Figure 1:
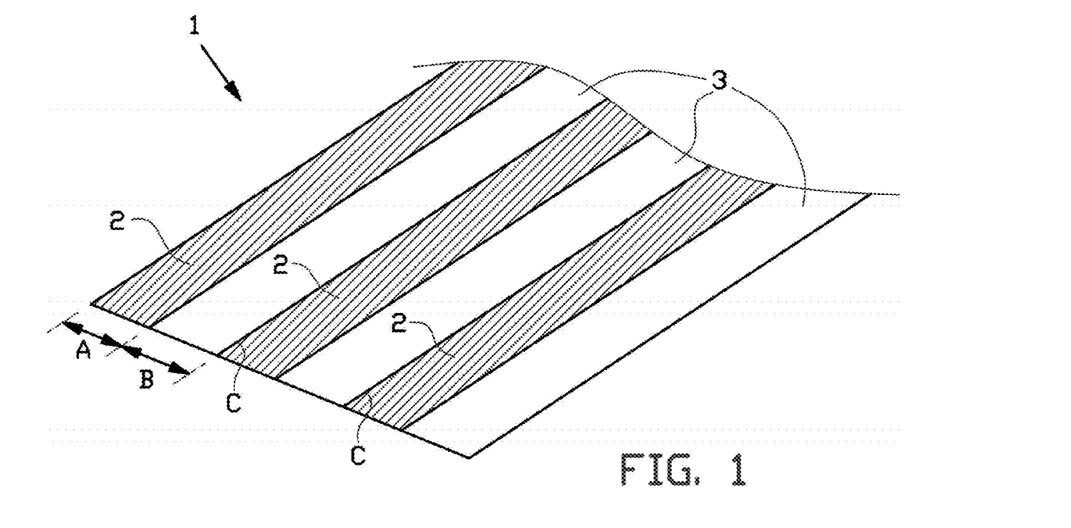
FIG. 1 shows a sheet according to an embodiment.

FIG. 1 shows a sheet 1 according to an embodiment. Sheet 1 comprises three non-transparent strips 2 and three transparent strips 3 extending in a longitudinal direction of said sheet, and each having a width in transverse direction of the sheet. The width of a non-transparent strip is indicated with arrow A and the width of a transparent strip is indicated with arrow B. Transparent strips 3 and nontransparent strips 2 alternate in transverse direction of the sheet 1. Although the dimensions in the present figures do not necessarily meet the actual dimensions, the width A of each non-transparent strip 2 is equal to or smaller than the width B of each transparent strip 3, with a width difference of at most 10 mm, for example, 2-8 mm.

Figure 2A:
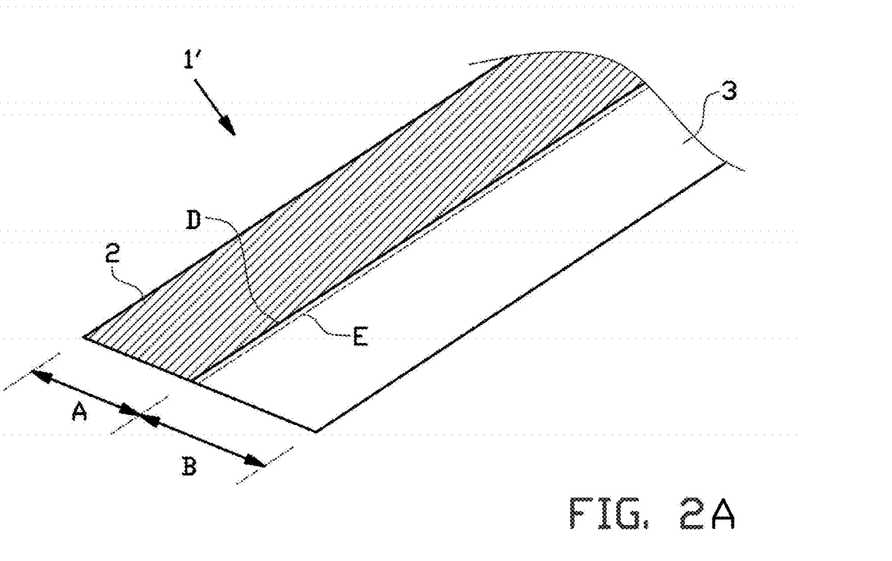
FIGS. 2A-2C show sheets for manufacturing a web of pouches according to various embodiments and obtained by cutting the sheet of FIG. 1.
Figure 2B:
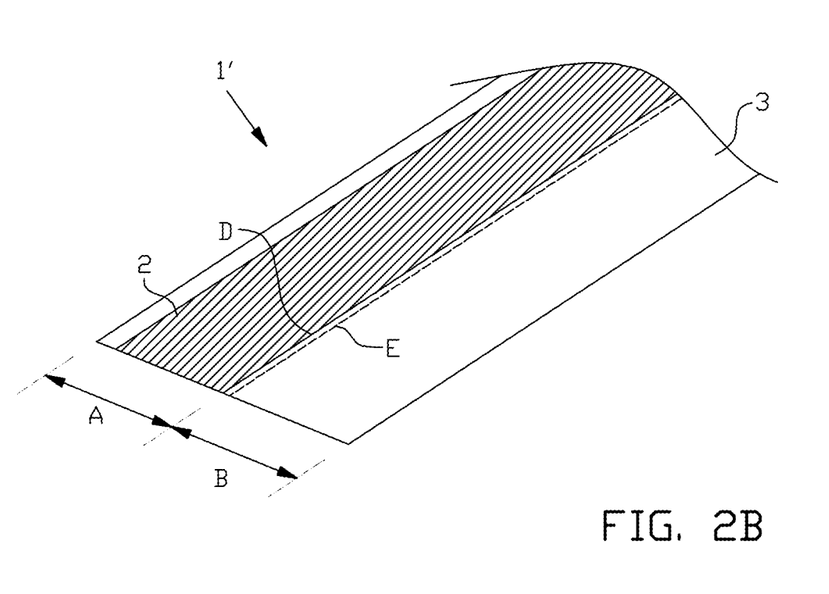
Figure 2C:
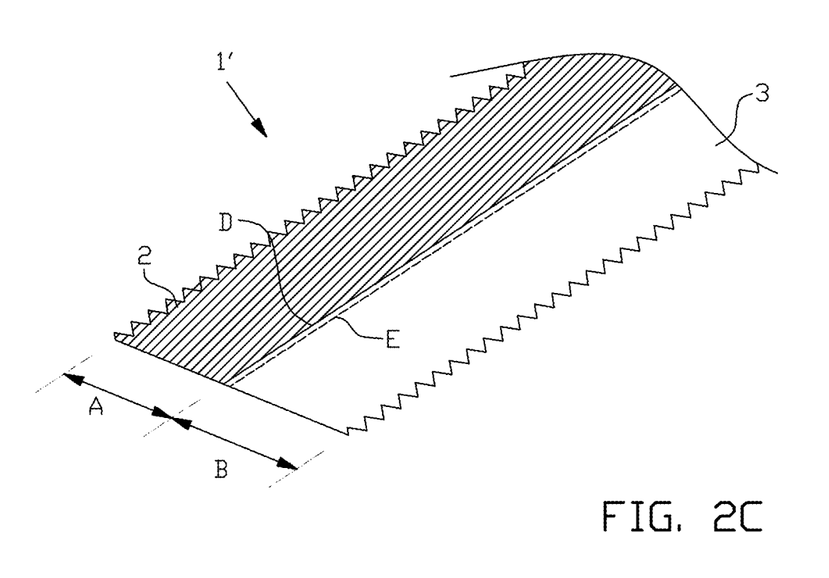

FIG. 2A shows a sheet 1' for manufacturing a web of pouches according to an embodiment. FIGS. 2B and 2C show further embodiments of sheet 1', with FIG. 2B including a transparent strip on the outer edge, and FIG. 2C showing serrated edges. The sheet 1' shown can be obtained by cutting the sheet of FIG. 1, along lines C for the embodiment of FIGS. 2A and 2C, and slightly outside lines C for FIG. 2B. This way three separate sheets 1' having a single transparent strip 3 and non-transparent strip(s) 2 can be obtained. Sheet 1' as depicted in FIG. 2A represents one of these sheets. Sheets 1' can be folded in the middle via fold line E to obtain folded sheets. Fold line E is at a distance of the edge D of at most 20% of the width of the pouch when formed and/or at most 2-8 mm, for example, at most 10% of the width of pouch or at most 1-4 mm. The fold obtained by folding along fold line E defines an edge (e.g., bottom edge fold) of a web of pouches that can be manufactured with sheet 1'.

The manufacturing process and web of pouches will be further explained with reference to FIGS. 3A-5.

Figure 3A:
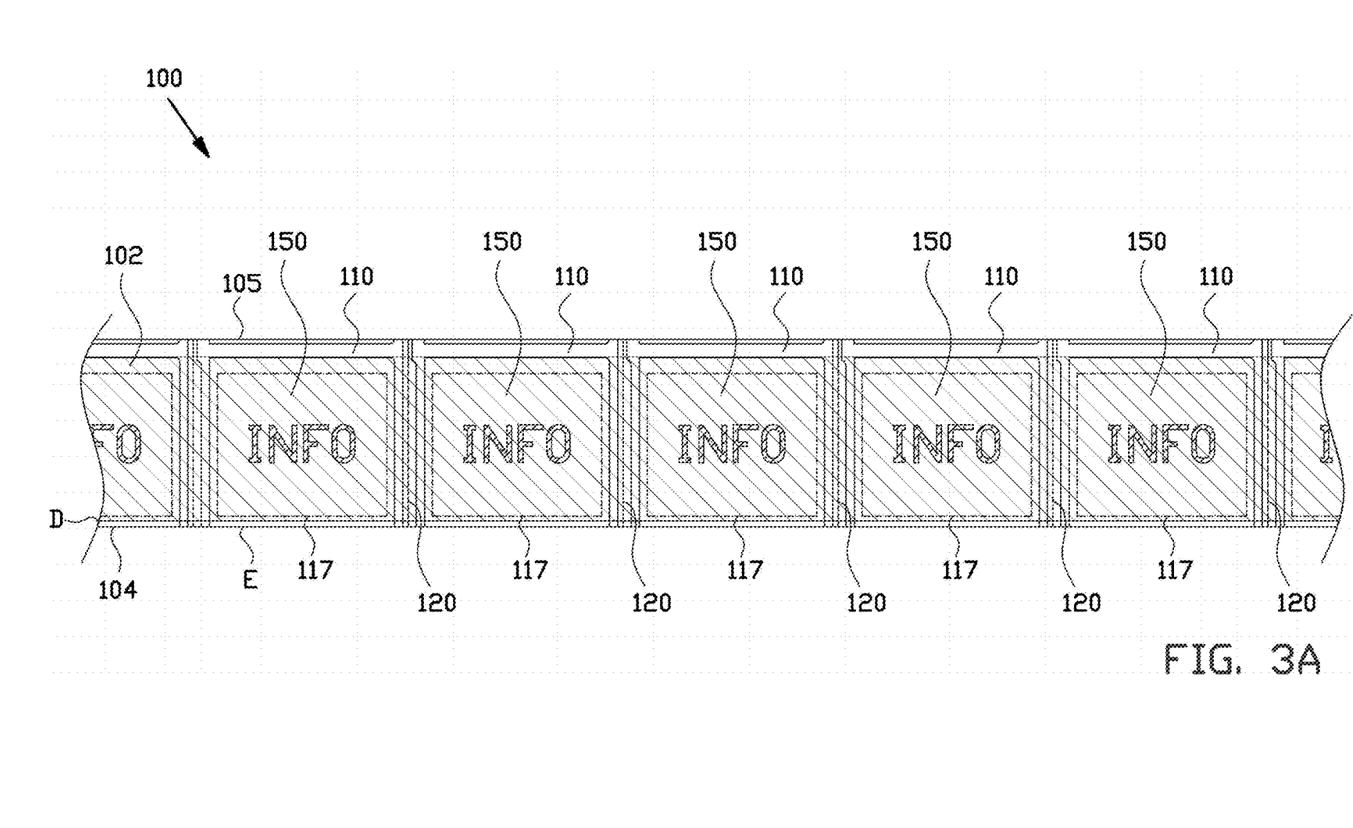
FIG. 3A shows a schematic view on the non-transparent side 102 of a web 100 of pouches 150 made with elongated sheet.
Figure 3B:
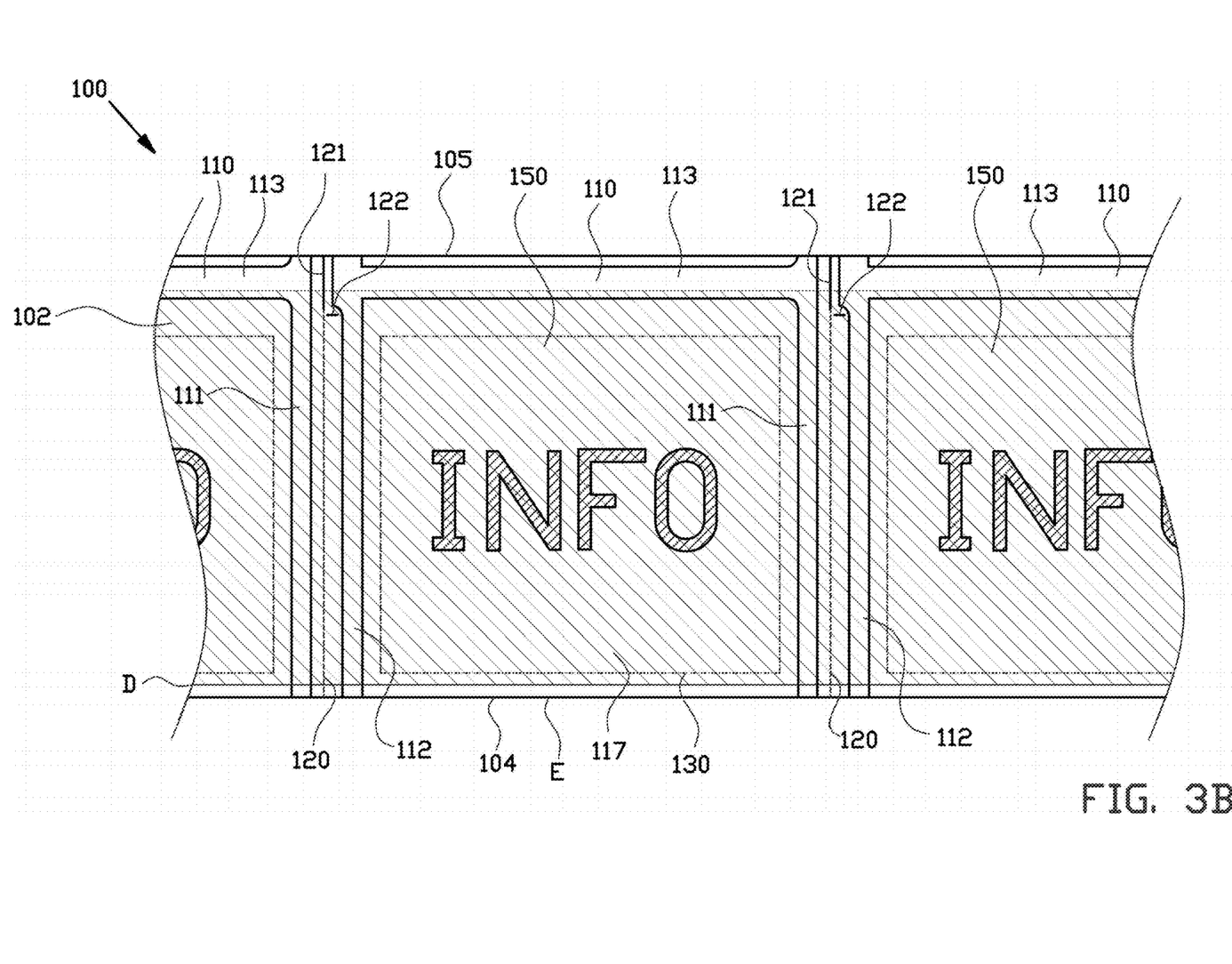
FIG. 3B shows a detailed part thereof.
Figure 3C:
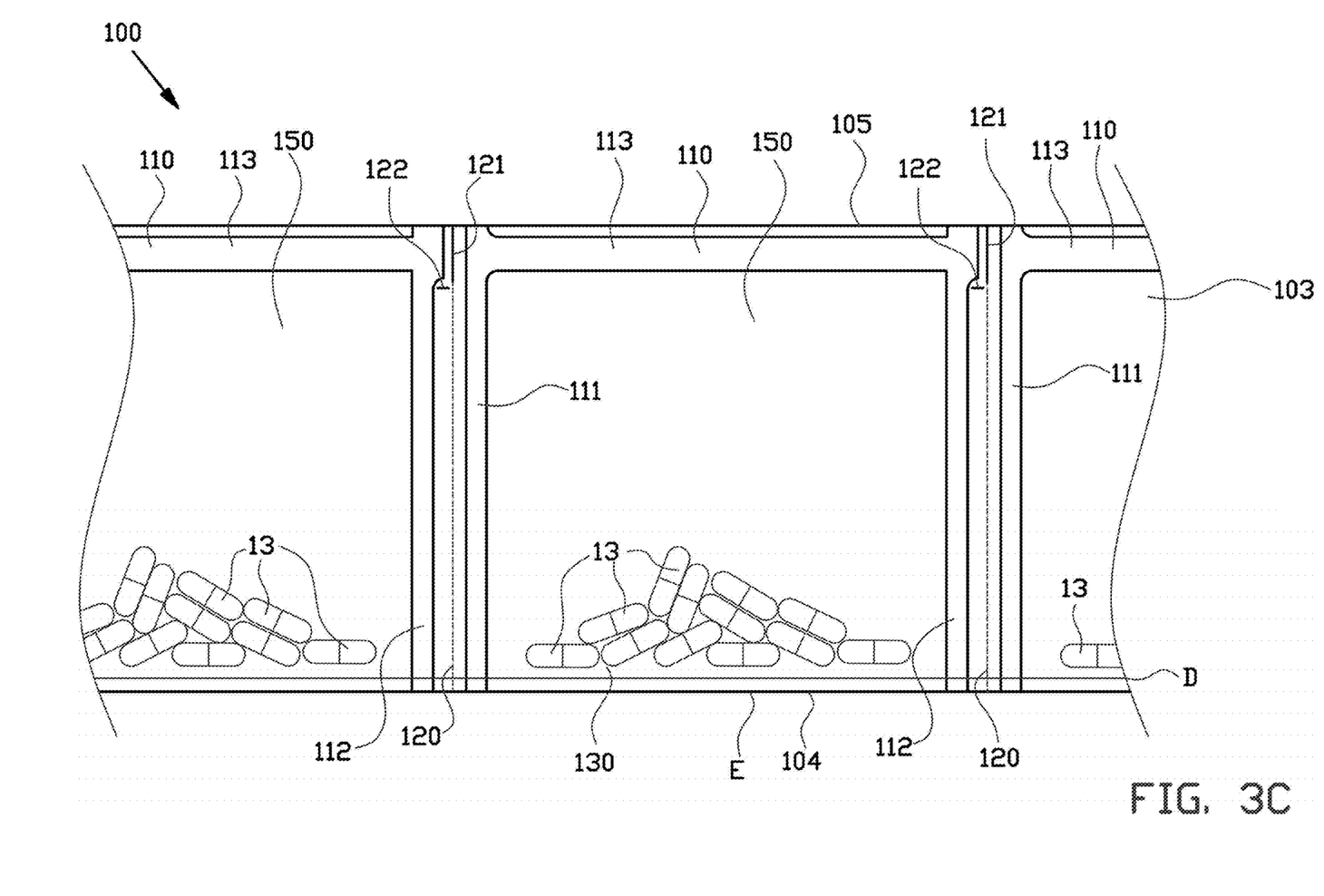
FIG. 3C shows a schematic view on the transparent side 103 of a web of pouches according as shown in FIG. 3B.

FIG. 3A shows a schematic view on the non-transparent side 102 (second side) of a web 100 of pouches 150 made from elongated sheet 1'. FIG. 3B shows a detailed part thereof. FIG. 3C shows a schematic view on the transparent side 103 (e.g., front side or first side) of a web of pouches as shown in FIG. 3B. FIGS. 3A-3C show the web 100 of pouches 150 made of elongated sheet 1' in its finished state. The web of pouches is made of plastic sheet 1' as shown in FIGS. 2A-2C, that is folded back onto itself by making a fold in sheet 1' via fold line E. Web 100 comprises a substantially non-transparent second side 102 which comprises the non-transparent strip 2 and a first side 103 which is transparent, with the second side 102 connecting to the first side 103 via a fold along line E that forms a bottom edge 104. The first side 103 and the second side 102 both have a top edge 105 at the same height with respect to the bottom edge 104. The non-transparent coating on the second side 102 comprises information printed (or otherwise placed, e.g., stamped) thereon as visualized by the indication "INFO". Edge D of the non-transparent strip at the second side 102 of the web is at distance is at most 10 mm from bottom edge 104. As the first side 103 is transparent, edge D can also be seen from the front as shown in FIG. 3C (for viewing purposes, transparent shading of second side 102 is not shown in FIG. 3C). In some embodiments, non-transparent side can include a further transparent edge at the sealing side 105 as well. This can extend about 1-8 mm, or from the side to just beyond the heat seal prior to the start of the printing area.

As best shown in FIGS. 3B and 3C, each pouch 150 in the web 100 comprises an elongated first heat seal 111 transverse to the longitudinal direction of the web 100, an elongated second heat seal 112 transverse to the longitudinal direction of the web 100 and an elongated top heat seal 113 between the first side 103 and the second side 102. Each first heat seal 111 and second heat seal 112 extend parallel to each other and transverse to the bottom edge 104, and the top heat seal 113 extends there between and extends parallel and spaced apart from the top edges 105, although it could also be right at the edge in some embodiments.

The separation perforation lines 120 extends between the top edge 105 and bottom edge 104 over more than half of the distance between the bottom edge 104 and the top edges 105. In this example the separation perforation lines 120 extend over more than 70% of the distance between the bottom edge 104 and the top edges 105, though that could vary in other systems depending on the size, type of sheet used, etc. Thereby foil bridges 121 are formed between the separation perforation lines 120 and the top edges 105, and a non-perforated portion 124 can be present at the bottom edge.

The elongated web 100 can be divided by tearing off the separation perforation lines 120, followed by tearing the foil bridges 121 to obtain a pouch 150 or a series of interconnected pouches 150. The tear notches 122 extend with respect to the bottom edge 104 at a height close to but below the top heat seal 113. The separated pouches 150 can be opened manually by tearing off the top heat seal 113, which is initialized at the tear notch 122.

Figure 4:
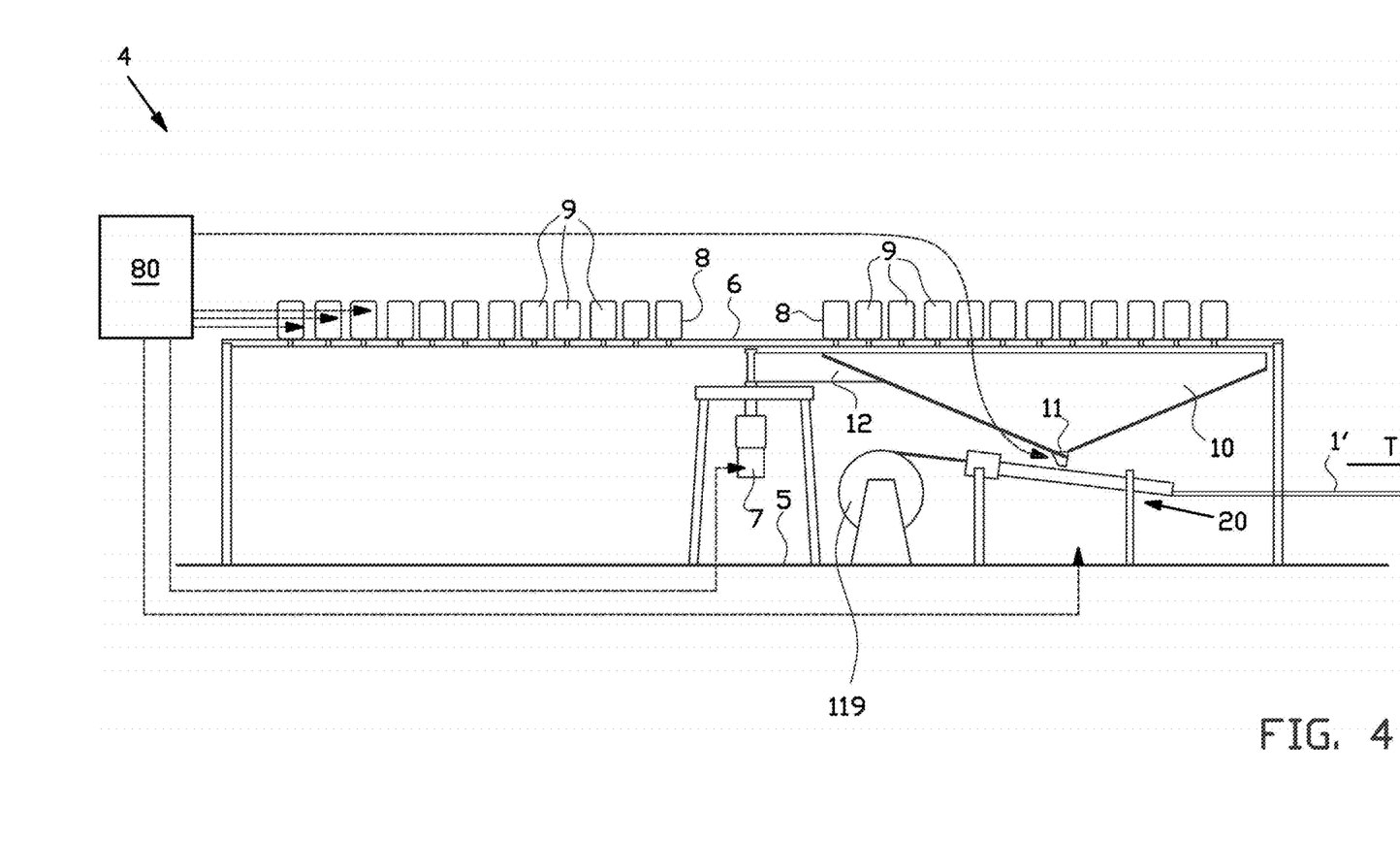
FIG. 4 shows a cross sectional view of a feeder device and a packaging device for pills according to an embodiment.

FIG. 4 shows a cross sectional view of a feeder device and a packaging device for pills according to an embodiment. The feeding device 4 comprises a frame 5 and a horizontally extending supporting disc 6 that supports multiple radially extending arrays 8 each having multiple canisters or feeder units 9. The feeding device 4 comprises an elongated collecting hopper 10 under the supporting disc 6 that is connected to a position control motor 7, such as a servo drive, on the frame 5 via a radially extending arm 12 to be rotated around a vertical axis. Each of the feeder units 9 can be filled with batches of different discrete medicaments. The feeder units 9 are configured to discharge individual discrete medicaments, which are collected by the collecting hopper 10 that is rotated under the discharging feeder unit 9 by means of the position control motor 7. In this manner a selection of discrete medicaments 13 is counted out. The collecting hopper 10 merges into a hopper outlet 11 to supply the selection of discrete medicaments 13 to a packaging device 20 for packing each of the compiled selection of discrete medicaments 13 in pouches 150. The collecting hopper 10 comprises a (not shown) hopper release valve with an actuator at the hopper outlet 11 for controlled release of the compiled selection of discrete medicaments 13. The electronic controller 80 is programmed to perform a desired processing method.

Figure 5:
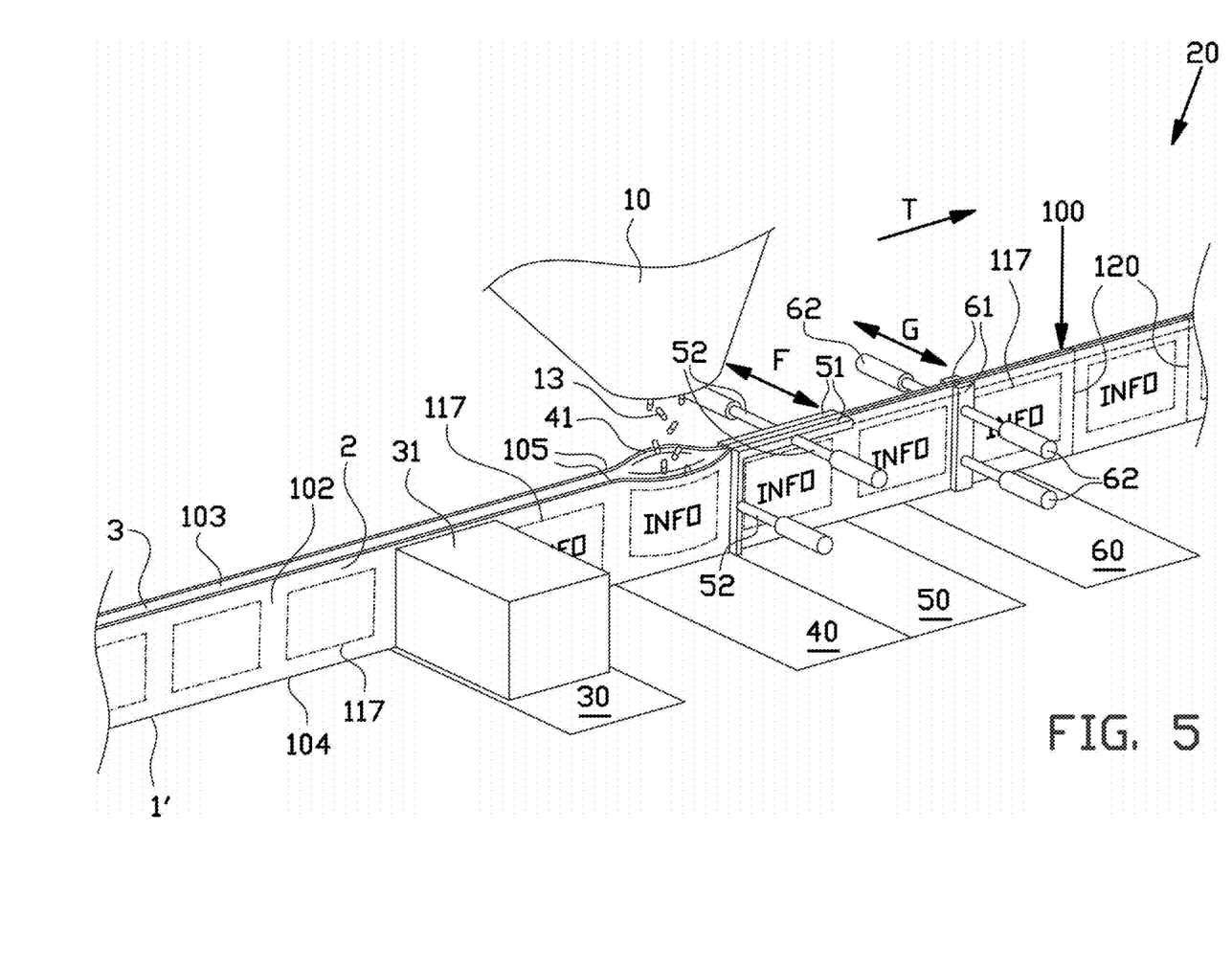
FIG. 5 shows a schematic isometric view of the packaging device of FIG. 4 for producing a web of pouches filled with pills according to an embodiment.

The packaging device 20 is shown in more detail in FIG. 5. FIG. 5 shows a schematic isometric view of the packaging device of FIG. 4 for producing a web of pouches filled with pills according to an embodiment, such as the web of pouches shown in FIG. 3A.

The packaging device 20 is configured to form and fill pouches 150 in an elongated sheet 1', for instance the one as shown in FIG. 2. The packaging device 20 comprises a sheet drive 23 for intermittent transport of the elongated sheet 1', in a transport direction T through the packaging device 20 over a sheet trajectory 22 of the packaging device 20. The elongated sheet 1' is typically rolled off a stock reel 119.

During the transport through the packaging device 20 in the transport direction T as shown in FIG. 5, the elongated sheet 1' is provided with subsequent heat seals 110 to provide a web 100 of compartments.

During the transport through the packaging device 20 the web 100 is provided with subsequent straight separation perforation lines 120 between the heat sealings 110.

During the transport through the packaging device 20 the elongated web 100 is also provided with subsequent tear notches 122 that start at and extend transverse to the separation perforation lines 120.

The sheet 1' defines printable areas 117 on the second side 102 within the heat sealings 110. Behind the printable area 117 the elongated web 100 forms sealed off compartments between the bottom edge 104 and the heat sealings 110 to contain and preserve the selection of medicaments 13.

As shown in FIG. 5, the packaging device 20 comprises, in series, a printing station 30, a filling station 40, a sealing station 50, and a perforation station 60. The printing station 30 comprises a printer 31 that is configured to print text and symbols onto the printable areas 117 of the elongated sheet 1', visualized with the indication "INFO". The filling station 40 comprises a spreader 41 below the hopper outlet 11 that is configured to spread the second side 102 and the first side 103 of the folded sheet 1' at the top edges 105 to receive a selection of discrete medicaments 13. The sealing station 50 comprises two L-shaped heat seal stamps 51 that are moveable or driven transverse to the elongated web 100 in direction F in a symmetric manner by means of a schematically shown stamp drive 52 to form the top heat seal 113 and the second heat seal 112 of one pouch 150, and to form the first heat seal 111 of the following pouch 150. The perforation station 60 comprises two perforation mechanisms, here shown as anvils 61 that are moveable or driven transverse to the web 100 of pouches in direction G in a symmetric manner by means of a schematically shown anvil drive 62 to form the separation perforation line 120 and the tear notch 122 between two pouches 150.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

LIST OF REFERENCE NUMBERS 1 elongated sheet with multiple transparent and non-transparent strips
1' elongated sheet with single transparent and single non-transparent strip
2 non-transparent strip
3 transparent strip
4 feeder device
5 frame
6 supporting disc
7 position control motor 8 radially extending arrays
9 feeder unit
10 collecting hopper
11 hopper outlet
12 arm
13 discrete medicaments
20 packaging device
22 web trajectory
23 web drive
30 printing station
31 printer
40 filling station
41 spreader
50 sealing station
51 seal stamp
52 stamp drive
60 perforation station
61 perforation anvil
62 anvil drive
80 electronic controller
100 web of pouches
102 second side
103 first side
104 bottom edge
105 top edge
110 heat sealing
111 first heat seal
112 second heat seal
113 top heat seal
117 printing area
119 stock reel
120 separation perforation line
121 foil bridge
122 tear notch
150 pouch

The invention claimed is:

1. Pouch for containing pills, the pouch formed of a sheet comprising a transparent strip and a non-transparent strip, the pouch comprising:
a first side and a second side connected via a bottom edge fold, a top seal opposite the bottom edge fold, and first and second side seals extending from the bottom edge fold to the top seal to define a space for containing pills,
wherein the first side of said pouch is transparent and formed from the transparent strip of the sheet, and wherein the second side of said pouch comprises the non-transparent strip and is substantially non-transparent, and wherein the non-transparent strip comprises an edge located at or within 20% of a width of the pouch from the bottom edge fold towards a top edge opposite the bottom edge fold, with the transparent strip of the sheet forming the bottom edge fold.

2. The pouch according to claim 1, wherein the second side of the pouch includes a transparent line strip along the top edge extending at most 10% of the width of the pouch.

3. The pouch according to claim 1, wherein the sheet comprises an inner layer of polyethylene (PE) and outer layer of polyethylene terephthalate (PET).

4. The pouch according to claim 1, and wherein the second of the pouch comprises a coating of non-transparent material forming the non-transparent strip.

5. The pouch according to claim 4, wherein said non-transparent coating further comprises information printed thereon.

6. The pouch according to claim 1, wherein said first side and second side are sealingly interconnected via said top seal and via the first and second side seals by means of heat seals.

7. The pouch according to claim 1, comprising one or more serrated edges.

8. Web of multiple pouches, each pouch of the multiple pouches for containing pills,
wherein each pouch is formed of a sheet comprising transparent strip and a non-transparent strip, where each pouch comprises a first side and a second side connected via a bottom edge fold, a top seal opposite the bottom edge fold, and first and second side seals extending from the bottom edge fold to the top seal to define a space for containing pills,
wherein the first side of said pouch is transparent and formed from the transparent strip of the sheet, and wherein the second side of said pouch comprises the non-transparent strip and is substantially non-transparent, wherein the non-transparent strip comprises an edge located at or within 20% of a width of the pouch from the bottom edge fold towards a top edge opposite the bottom edge fold, with the transparent strip of the sheet forming the bottom edge fold; and
wherein the pouches in the web are interconnected via their respective first and second side edges.

9. The web according to claim 8, which comprises perforation lines between respective first and second side edges of adjacent pouches.

10. The web according to claim 9, wherein the perforation lines are provided with a tear notch.

11. The web according to claim 10, wherein the tear notch is in the form of a triangular notch.

12. Method for manufacturing a web of pouches according to claim 8, the method comprising:
obtaining a pouch sheet comprising a transparent strip and a non-transparent strip;
folding said pouch sheet along a longitudinal fold line positioned at most 10 mm from the non-transparent strip; wherein the fold line defines a bottom edge of said web connecting a transparent first side formed of the transparent strip and a substantially non-transparent second side comprising the non-transparent strip;
introducing at predetermined positions along the folded sheet one or more pills between said first side and second side; and
sealing the first side to the second side at predetermined positions transverse to the fold and at a position opposite to the fold; wherein each pouch contains said one or more pills; and
wherein each pouch is formed of a sheet comprising transparent strip and a non-transparent strip, where each pouch comprises a first side and a second side connected via a bottom edge fold, a top seal opposite the bottom edge fold, and first and second side seals extending from the bottom edge fold to the top seal to define a space for containing pills,
wherein the first side of said pouch is transparent and formed from the transparent strip of the sheet, and wherein the second side of said pouch comprises the non-transparent strip and is substantially non-transparent, wherein the non-transparent strip comprises an edge located at or within 20% of a width of the pouch from the bottom edge fold towards a top edge opposite the bottom edge fold, with the transparent strip of the sheet forming the bottom edge fold.

13. The method according to claim 12, wherein sealing comprises heat sealing.

14. The method according to claim 12, wherein the sheet from which the web is manufactured is provided with information prior to the step of folding.

15. The method according to claim 12, further comprising providing at one or more predetermined positions information on said non transparent second side.

16. The method according to claim 15, wherein said information is provided by printing.

17. The method according to claim 12, wherein a perforation line is introduced between consecutive pouches in the web.

18. The pouch according to claim 1, comprising a tear notch on at least one of the top or side edges.

* * * * *